INCREASING THE POWER OUTPUT OF CERTAIN DIODES

Filed July 29, 1968

INVENTORS H-S. LEE
H. E. NOFFKE
D. K. WILSON
BY Francis E. Morris
ATTORNEY

3,532,910
INCREASING THE POWER OUTPUT OF CERTAIN DIODES

Hsing-San Lee, Beacon, N.Y., and Herbert E. Noffke, Long Valley, and Donald K. Wilson, Morristown, N.J., assignors to Bell Telephone Laboratories, Incorporated, Murray Hill and Berkeley Heights, N.J., a corporation of New York Filed July 29, 1968, Ser. No. 748,419
Int. Cl. H01l 7/54, 9/10
U.S. Cl. 317—234 6 Claims

ABSTRACT OF THE DISCLOSURE

An $X^+YY^+$ diode, X and Y being opposite types of conductivity, in which the power output is less than optimum, is irradiated with energetic subatomic particles, preferably electrons, to increase the power output.

GOVERNMENT CONTRACT

Figure 1:
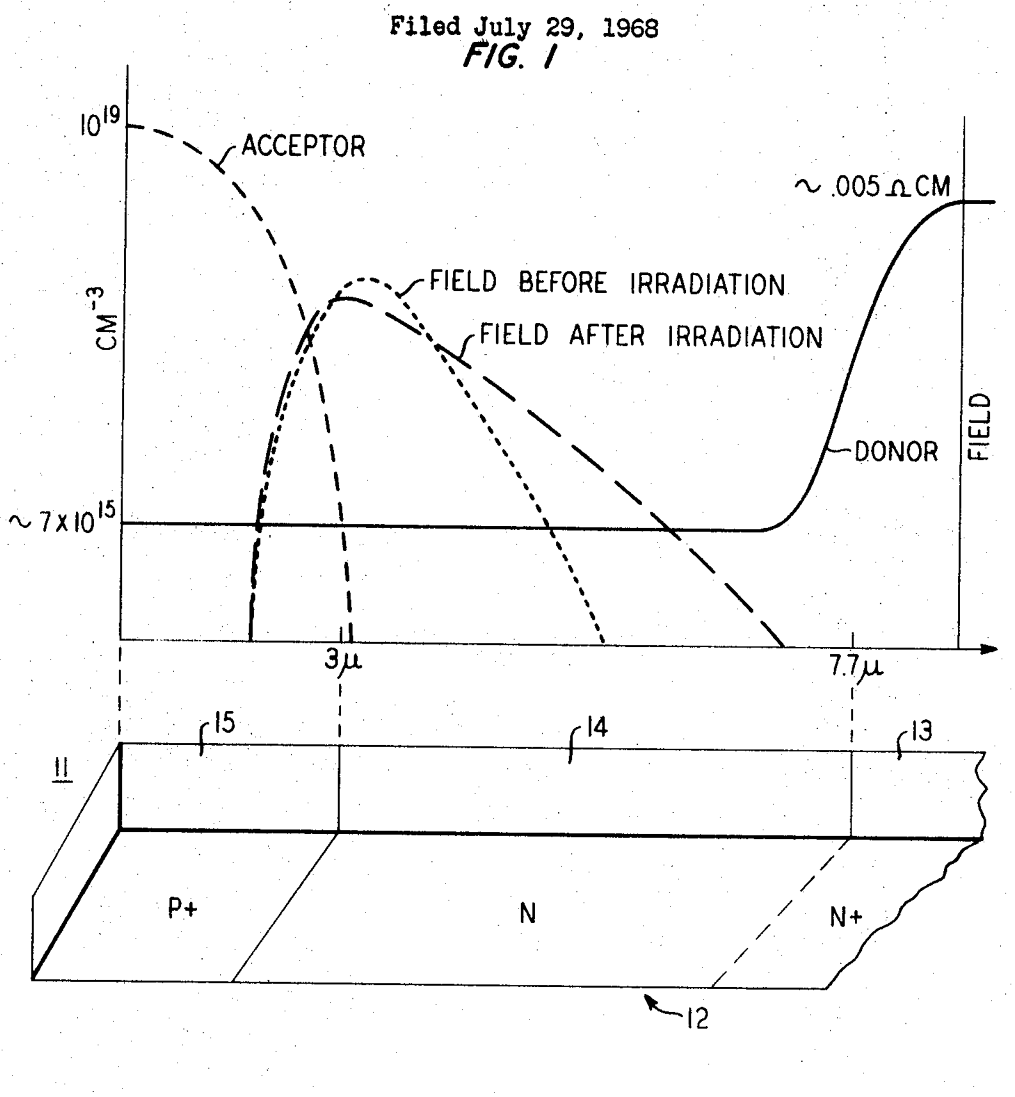

The invention herein claimed was made in the course of, or under contract with the Department of the Air Force.

This invention is related to semiconductive devices and more particularly to improvements produced in such devices by irradiation with subatomic particles.

It has long been known that irradiation affects the performance of semiconductive devices. Usually the results of irradiation are deleterious, but in some cases they may be advantageous. For example, it has been known that irradiation can be used to increase diode switching speed by reducing minority carrier lifetime in the diode. Such irradiation is ordinarily accomplished using electrons with an energy of a few million electron volts (mev.) and densities of from $10^{15}$ to $10^{16}$ electrons per square centimeter. Such irradiation has no effect on the power output of the diode.

In contrast, it is our objective in this invention to increase the power output of certain semiconductive diodes by irradiating them with higher densities of electrons or with similar densities of neutrons. And more precisely, it is our objective to increase the power output of certain $X^+YY^+$ diodes operated in the reversed bias condition, where X and Y are opposite types of conductivity. Rather than use irradiation to reduce minority carrier lifetime as in the case of the switching diode, we use irradiation with subatomic particles to produce a specific, optimum carrier concentration in the diode; and consequently we are able to control the width of the depletion layer, or space-charge region, so as to attain a specific, optimum width.

While it is our objective in this invention to increase the power output of certain reversed bias $X^+YY^+$ diodes and to achieve this improvement by irradiating such diodes, our research has concentrated on the $P^+NN^+$ IMPATT diode. This diode is a negative resistance device, which means that an increase in current output from the device is associated with a decrease in the voltage applied to the device and a decrease in current is associated with an increase in voltage. This is equivalent to saying that voltage and current are between 90 degrees and 270 degrees out of phase.

In the IMPATT diode this phase shift is produced by a combination of avalanche current multiplication and transit time or drift delay. In avalanche current multiplication a high reversed bias voltage is applied to the PN junction of the diode to accelerate the carriers moving across the junction. This voltage is sufficiently high that the carrier electrons move fast enough to collide with and free other electrons in the crystal structure of the diode.

Because the carriers thus freed can in turn produce other carriers, an avalanche of current is created. If the applied voltage is varied rapidly above and below the point at which avalanche occurs, a current delay, or phase shift, results because the avalanche takes time to build up as the voltage rises and time to subside as the voltage decreases. With relatively small signals and high frequencies, this phase shift can approach 90 degrees.

Additional phase shift is obtained with transit time delay, which is the delay caused by the time it takes carriers to travel across the non-avalanching portion of the space-charge region, called the "drift" region. At microwave frequencies, this time is long enough that carriers complete their traversal of the device out of phase with the applied voltage. Further details about the operation of the IMPATT diode may be found in K. D. Smith, "The IMPATT Diode—A Solid-State Microwave Generator," Bell Labs Record, vol. 45, page 144 (May 1967); T. Misawa, "Microwave Si Avalanche Diode With Nearly-Abrupt-Type Junction," IEEE Transactions on Electron Devices," vol. ED–14, page 580 (September 1967); and B. C. De Loach, Jr., et al., U.S. Pat. No. 3,270,293.

The formation of the $P^+NN^+$ IMPATT diode used in our experiments is described by T. Misawa in his above-cited publication. The $P^+N$ junction is made by diffusing boron into a uniformly doped N-type silicon epitaxial layer that is formed by known methods on a monocrystalline silicon substrate of $N^+$-type conductivity. The operating characteristics of this diode depend on the width and resistivity of the epitaxial layer. For optimum power output, the space-charge depletion region should extend through, or "sweep out," the N zone in the epitaxial layer, for if the depletion region does not so extend, the unswept portion of the N zone introduces a parasitic series resistance that decreases the power output of the diode.

In contrast to the prior art experience that irradiation of diodes does not affect their power output, we have learned that irradiation is useful to increase the power output of certain diodes. From our experiments, it is apparent that irradiation can be used to control the resistivity of the N zone of a $P^+NN^+$ IMPATT diode enough to increase the width of the depletion region precisely to the point where it extends throughout the N zone. Moreover, irradiation evidently does not affect the $P^+$ and $N^+$ zones of the diode enough to degrade performance.

The improvement in performance that we have observed, however, is far in excess of what we have calculated can be achieved merely by eliminating the unswept portion of the N zone. From our results, it is also apparent that irradiation can be used to increase the width of the "drift" region and consequently the transit time delay. Accordingly, we have theorized that increasing the width of the drift region causes an increase in the magnitude of the negative space-charge resistance. And measurements of the space-charge resistance of diodes have shown a marked increase in resistance after irradiation, in support of our theory.

Figure 2:
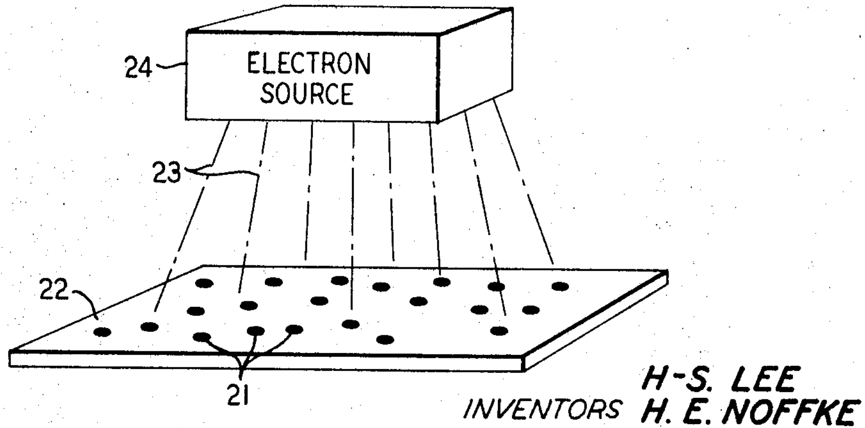

Our invention will become clearer in the following detailed description in which:

FIG. 1 is a representation of the doping levels and field distribution in a typical reversed bias $P^+NN^+$ diode also showing the effect of irradiation on the field distribution; and FIG. 2 is a schematic illustration of the practice of our invention in batch processing or continuous processing.

As has been described above, the $P^+NN^+$ IMPATT diode we used is made by diffusing boron into a uniformly doped, N-type conductivity, silicon epitaxial layer that is formed by known methods on a monocrystalline silicon substrate of $N^+$-type conductivity. As a result, with reference to the cutaway schematic diagram in the lower half of FIG. 1, a $P^+NN^+$ diode 11 is formed in a wafer 12 of monocrystalline silicon comprised of an $N^+$ substrate 13, an N zone 14 and $P^+$ zone 15.

The doping profile of IMPATT diodes varies widely from diode to diode, depending on the frequency at which a particular diode is designed to operate. The substrate of all IMPATT diodes is usually very highly doped, having a donor concentration of about $10^{20}$/cm.$^3$. However, the donor concentration throughout the epitaxial layer varies from about $10^{14}$/cm.$^3$ to $10^{17}$/cm.$^3$ while the acceptor contration at the surface ranges from approximately $10^{17}$/cm.$^3$ to $10^{20}$/cm.$^3$. Likewise, the thickness of the epitaxial layer varies from about one micron to 100 microns, and the depth of the $P^+N$ junction from the surface ranges from about 0.5 micron to ten microns. As indicated by the doping profile depicted in the top half of FIG. 1, in the devices we used, the donor concentration throughout the epitaxial layer was approximately $7 \times 10^{15}$/cm.$^3$ while the acceptor concentration at the surface was about $10^{19}$/cm.$^3$; and the thickness of the epitaxial layer was approximately 7.8 microns while the depth of the $P^+N$ junction from the surface was about three microns.

In accordance with conventional manufacturing practices, hundreds of such diodes are usually formed simultaneously in a silicon wafer of suitable size. The diodes are then separated from each other, mounted on heat sinks, wired, and packaged. Typically, they are packaged in small, cylindrical, ceramic encapsulations such as those described in the above-cited Smith publication; but they can also be sealed into conventional diode packages.

When such a $P^+NN^+$ diode is biased at sufficient reverse voltage to operate in the IMPATT region, the field profile in the device approximates that given in FIG. 1. Ideally, the thickness and resistivity of the epitaxial layer are such that the space-charge layer, and hence the field, terminate just before the substrate, as is indicated by the dashed-line field profile. Practically, however, it is very difficult to control the processes affecting the thickness and resistivity of the N zone enough to ensure termination just before the substrate; and consequently, large quantities of inferior $P^+NN^+$ diodes are often made having a space-charge layer that terminates before the ideal point, as is indicated by the dotted-line field profile. Although the distance between the ideal point and the point where the layer terminates, which distance is called the unswept region, is often as small as one micron, this distance produces sufficient parasitic series resistance to cause an appreciable reduction in the power output of the diode.

In our invention the efficiency of such inferior diodes is improved considerably by irradiating the diodes with neutrons or electrons. Such irradiation affects the diode enough that the field in the irradiated diode becomes substantially the same as that in the ideal diode, as is indicated by the dashed-line field profile, and the performance of the diode is accordingly improved. The apparent reasons for this improvement have been discussed above.

We have used in our experiments a neutron source having a spectrum of energies ranging from several thousand electron volts (kev.) to about fifteen million electron volts (mev.). Neutrons with any energy in this range readily go through each diode encapsulation and diode, producing dislocations in the crystalline structure of the diode. Under these conditions, we have observed that the diodes should be irradiated by a total of approximately $10^{15}$ neutrons per square centimeter to produce significant improvements in the diodes. Morever, while $10^{15}$ neutrons/cm.$^2$ was approximately the smallest number of neutrons that produced appreciable results in the diodes tested, our experiments showed that there was little more to be gained by irradiating with more than $10^{16}$ neutrons per square centimeter. The improvement in performance that can be obtained varied with the quality of the diode; the better the diode before irradiation, the less irradiation improved its performance. The range of improvements in power outputs obtained in our experiments was from two to six decibels.

In some instances, it is preferable to use high energy electrons for irradiation when the diodes are irradiated in their packages. Electrons with an energy of several mev. easily penetrate the ceramic or metallic packages in which the diodes are contained without activating the package; but neutrons may cause activation. When electrons are used for irradiation, a total of approximately $10^{16}$ electrons per square centimeter are needed to produce significant improvements in the diodes; and there is little more to be gained by irradiation with more than $10^{18}$ electrons per square centimeter.

As illustrated in FIG. 2, our invention readily lends itself to mass production. At present, it seems preferable to form the diodes by conventional means, package them and test them individually to ascertain which diodes might be improved by the practice of our invention. The diodes that are selected by this process, shown as elements 21 of FIG. 2, are then placed in a tray 22 and exposed to a flux of electrons 23 from a high energy electron surface 24.

There are available many commercial devices for supplying electrons of several mev. in energy: for example, Van de Graff generators with outputs of up to ten mev. and linear accelerators with energy ranges of up to fifteen mev. Because electrons with energies in excess of two mev. can readily go through either the packages in which each diode is contained or the heat sink on which each diode is mounted and then go through the diode, the diodes can be randomly positioned in tray 22. Because the production of improved diodes depends on the total number of electrons incident on each diode, the length of irradiation depends on the number of high energy electrons produced by electron source 24 per unit time. With the fluxes presently available from Van de Graff generators, irradiation times as low as ten minutes are achievable.

The irradiation can be accomplished with either batch or continuous processing. Thus, trays of diodes may be placed within range of the electron source, irradiated for the proper length of time, and then removed; or the tray can be mounted on suitable means for moving it through the electron flux for the correct length of time and then out of it. Which of these processes is preferable depends on the manufacturing equipment and space available and on the quantities of diodes to be treated by our invention.

Although our invention has been described in terms of irradiation of a $P^+NN^+$ diode, it may also be practiced on other diodes. Specifically, it can be practiced on an $N^+PP^+$ IMPATT diode. It may also be used for varactor diodes having similar doping configuration because such diodes are similar to IMPATT diodes insofar as their efficiency is affected by parasitic series resistance in the high resistivity zone. In addition, the invention may be used for diodes made of semiconductive materials other than silicon. In such a case it may prove advantageous to irradiate the diodes with a different number of subatomic particles/cm.$^2$ than that used in irradiating silicon diodes.

In theory, the invention can also be used for diodes with other doping configurations, such as the PN diode. In practice, however, such diodes are ordinarily very inefficient and would not be used in applications where high efficiency was required.

It will be appreciated that those skilled in the art may devise still other arrangements that fall within the spirit and scope of our invention.

What is claimed is:

1. An $X^+YY^+$ semiconductive diode, where X and Y are opposite types of conductivity and the diode has been irradiated by at least approximately $10^{15}$ subatomic particles per square centimeter.

2. The diode of claim 1 wherein the semiconductive diode is made of silicon, the subatomic particles are neutrons and the diode is irradiated with a total of between $10^{15}$ and $10^{16}$ neutrons per square centimeter.

3. The diode of claim 1 wherein the semiconductive diode is made of silicon, the subatomic particles are electrons and the diode is irradiated with a total of between $10^{16}$ and $10^{18}$ electrons per square centimeter.

4. The diode of claim 1 adapted for operation as an IMPATT diode.

5. The diode of claim 1 adapted for operation as a varactor diode.

6. The diode of claim 1 in which an epitaxial layer of Y-type conductivity is formed on a substrate of $Y^+$-type conductivity and a zone of $X^+$-type conductivity is formed in the epitaxial layer of Y-type conductivity.

References Cited

UNITED STATES PATENTS 3,400,306 9/1968 Knauss ............. 317—234

JERRY D. CRAIG, Primary Examiner

U.S. Cl. X.R.

29—569